United States Patent
Romero

(10) Patent No.: US 10,275,765 B2
(45) Date of Patent: Apr. 30, 2019

(54) OMNI-CHANNEL STATE PRESERVATION

(71) Applicant: eBay Inc., San Jose, CA (US)

(72) Inventor: Steven Romero, Portland, OR (US)

(73) Assignee: eBay Inc., San Jose, CA (US)

( * ) Notice: Subject to any disclaimer, the term of this patent is extended or adjusted under 35 U.S.C. 154(b) by 262 days.

(21) Appl. No.: 14/102,688

(22) Filed: Dec. 11, 2013

(65) Prior Publication Data

US 2015/0163254 A1 Jun. 11, 2015

(51) Int. Cl.

| G06F 15/16 | (2006.01) |
|---|---|
| G06Q 20/38 | (2012.01) |
| H04L 12/801 | (2013.01) |
| H04L 29/08 | (2006.01) |
| G06Q 20/12 | (2012.01) |
| G06Q 30/06 | (2012.01) |

(52) U.S. Cl.
CPC .......... G06Q 20/38 (2013.01); G06Q 20/12 (2013.01); G06Q 30/06 (2013.01); H04L 47/10 (2013.01); H04L 67/148 (2013.01); H04L 67/142 (2013.01)

(58) Field of Classification Search
CPC ...... G06Q 20/38; H04L 47/10; H04L 65/1066
USPC ...................................................... 709/227
See application file for complete search history.

(56) References Cited

U.S. PATENT DOCUMENTS

| 8,515,490 | B2 * | 8/2013 | Moganti | ............... | H04L 67/30 |
| | | | | | 370/338 |
| 8,625,796 | B1 * | 1/2014 | Ben Ayed | ........... | H04L 63/0853 |
| | | | | | 380/258 |
| 8,713,093 | B1 * | 4/2014 | Upadhyay | ........... | H04L 67/2842 |
| | | | | | 709/203 |
| 9,098,592 | B2 * | 8/2015 | Ivory | ...................... | H04L 67/02 |
| 2003/0195963 | A1 * | 10/2003 | Song | ................. | G06F 17/30861 |
| | | | | | 709/227 |
| 2008/0289029 | A1 * | 11/2008 | Kim | .................. | G06F 17/30905 |
| | | | | | 726/12 |
| 2009/0063690 | A1 | 3/2009 | Verthein et al. | | |
| 2009/0228606 | A1 | 9/2009 | Mccarthy et al. | | |
| 2012/0250858 | A1 | 10/2012 | Iqbal et al. | | |
| 2012/0297007 | A1 * | 11/2012 | Burckart | ........... | G06F 17/30873 |
| | | | | | 709/208 |

(Continued)

FOREIGN PATENT DOCUMENTS

WO  WO-2015089209 A1  6/2015

OTHER PUBLICATIONS

"International Application Serial No. PCT/US2014/069588, International Search Report dated Mar. 2, 2015", 2 pgs.

(Continued)

*Primary Examiner* — Vivek Srivastava
*Assistant Examiner* — Atta Khan
(74) *Attorney, Agent, or Firm* — Schwegman Lundberg & Woessner, P.A.

(57) ABSTRACT

In various example embodiments, systems, methods and media for omni-channel state preservation are provided. In example embodiments, a method comprises identifying a plurality of flow chain elements in a transaction flow of a user session, causing the presentation of a first flow chain element in the transaction flow in an interface of a first user device, causing the presentation of a second flow chain element in the transaction flow in an interface of a second user device, and preserving a state of the user in the session when causing the presentation of the second flow chain element in the second user device.

20 Claims, 6 Drawing Sheets

(56) References Cited

U.S. PATENT DOCUMENTS

| | | |
|---|---|---|
| 2013/0290041 A1 | 10/2013 | Harley |
| 2014/0207622 A1* | 7/2014 | Vijayaraghavan ............................ G06Q 30/0631 705/26.62 |
| 2015/0169203 A1* | 6/2015 | Noolu ................... H04M 3/541 715/748 |
| 2015/0201040 A1* | 7/2015 | Horling ............... H04L 67/1095 709/203 |
| 2016/0173617 A1* | 6/2016 | Allinson ................. H04L 67/02 709/227 |

OTHER PUBLICATIONS

"International Application Serial No. PCT/US2014/069588, Written Opinion dated Mar. 2, 2015", 5 pgs.

\* cited by examiner

OMNI-CHANNEL STATE PRESERVATION

FIELD

The present disclosure relates generally to omni-channel state preservation across different communication channels and, in some specific examples, to state preservation in an online marketplace environment.

BACKGROUND

It is difficult to continue an internet session (i.e. preserve state) when changing communications channels. For example, it is difficult to start a purchase transaction session on one mobile device, and then continue that specific session on another device, particularly if one seeks to continue the session at an extended later time. Sometimes, a user might wish to continue a session on another device more suited to the type of transaction in question, or at a more convenient time.

SUMMARY

The present inventor seeks to address the problems discussed above. The inventor recognizes, among other things, that problems to be solved can include the inconvenience of interrupting a user session when changing communication channels from one device to another, for example. In some cases, data may be lost or item selections may go to waste. Sometimes, item selections are made with great care. In some cases, data may need to be to be re-entered when a new session is entered. User engagement levels are sometimes key factors in assessing the performance of content providers and online impact. Session interruption is not helpful in this regard. In fact, such interruption can be very counter-productive. Potential sales or user interest can be lost in an instant. Some devices are not optimal (or optimized) for the presentation of certain online content or displaying intuitive or helpful interfaces, for example. Some devices inhibit the completion of certain types of transactions. For example, a user might not seek to purchase a car using a mobile device in an office environment, but might feel comfortable in browsing online marketplaces at break periods during the day to look for vehicles matching the user's general needs and preferences. The user might seek to complete a purchase transaction later that day at home using a PC with a larger, more visible screen, and in dealing with more detailed aspects such as making a final decision and authorizing the use of funds online, for example. In some examples, the present subject matter preserves the user's online state in transitioning from the mobile to the PC so that a seamless session can be experienced.

The present subject matter can help provide a solution to these problems such as by providing an omni-channel state preservation system, related methods and machine-readable media. This subject matter can allow users and content providers in an online marketplace, for example, to extend user sessions or provide sessions without interruption as users move from device to device. In some examples, the presentation of targeted information can be optimized to promote user interaction and engagement.

In some examples, a system comprises a memory and omni-channel state preservation module, executing on at least one computer processor, to identify a plurality of flow chain elements in a transaction flow of a user session; cause the presentation of a first flow chain element in the transaction flow in an interface of a first user device; cause the presentation of a second flow chain element in the transaction flow in an interface of a second user device; and preserve a state of the user in the session when causing the presentation of the second flow chain element in the second user device.

In some examples, the first and second flow chain elements of the transaction flow may be time-contiguous elements in the transaction flow, and an end of the first flow chain element may be based on a position of the user in the session when the user leaves the first user device.

In some examples, a status of the user at a beginning of the second flow chain element caused to be presented in the interface of the second user device is based on a status of the user in the first flow chain element of the transaction flow.

In some examples, the omni-channel state preservation module is further configured to detect a user action on the first or second user device, and cause the presentation of the second flow chain element in the interface of the second user device in response to the detection of the user action.

In some examples, the omni-channel state preservation module is further configured to identify a status of the user in each of a plurality of sessions performed on the first user device, and cause the presentation of a second flow chain element in the interface of the second user device based on the identified status.

In some examples, the omni-channel state preservation module is further configured to detect an identity or characteristic of the first or second user device, and configure the content, timing, or presentation of the first or second flow chain element based on the identified identity or characteristic.

In another example embodiment, a machine-readable medium is provided for storing instructions which, when executed by the machine, cause the machine to perform operations identifying a plurality of flow chain elements in a transaction flow of a user session; causing the presentation of a first flow chain element in the transaction flow in an interface of a first user device; causing the presentation of a second flow chain element in the transaction flow in an interface of a second user device; and preserving a state of the user in the session when causing the presentation of the second flow chain element in the second user device.

In some examples, a system may comprise a machine and an omni-channel state preservation module. The machine may have a memory and at least one processor. The machine, including the state preservation module, may include the features or be configured to perform the operations, functions, and method steps discussed within the present disclosure.

In some examples, a non-transitory machine-readable medium may include a set of instructions that, when executed by at least one processor, causes the at least one processor to perform the operations, functions, and method steps discussed within the present disclosure.

These and other examples and features of the present system, related methods, and machine-readable media will be set forth in part in the following Detailed Description. This Summary is intended to provide non-limiting examples of the present disclosure. It is not intended to provide an exclusive or exhaustive explanation. The Detailed Description below is included to provide further information about the present disclosure.

BRIEF DESCRIPTION OF DRAWINGS

Some embodiments are illustrated by way of example and not limitation in the figures of the accompanying drawings.

DETAILED DESCRIPTION

Figure 1:
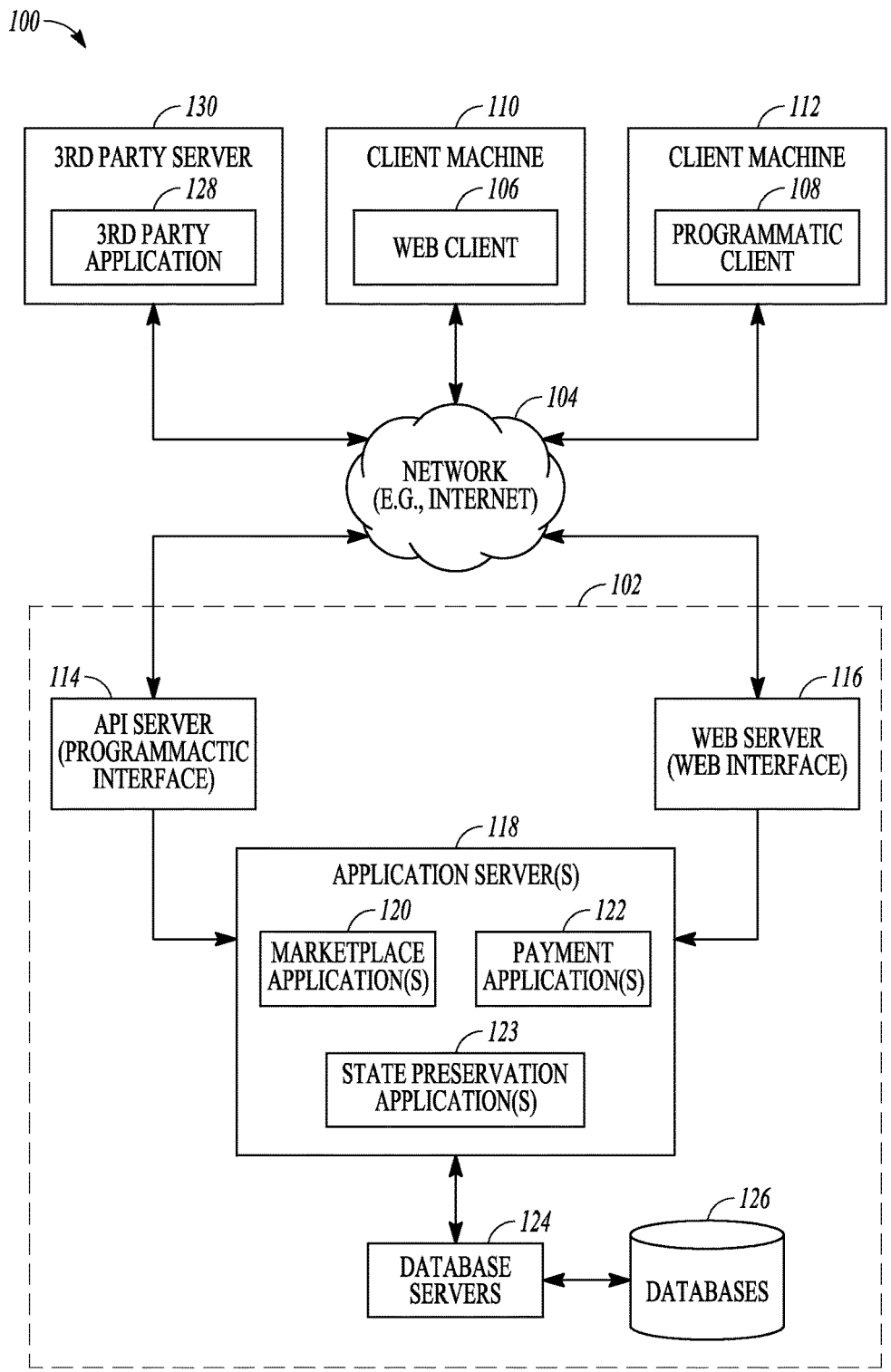
FIG. 1 illustrates a network diagram depicting an example system for providing omni-channel state preservation, in accordance with some embodiments.

The description that follows includes systems, methods, techniques, instruction sequences, and computing machine program products that embody illustrative embodiments of the present subject matter. In the following description, for purposes of explanation, numerous specific details are set forth in order to provide an understanding of various embodiments of the inventive subject matter. However, it will be evident to those skilled in the art that embodiments of the inventive subject matter may be practiced without these specific details. In general, well-known instruction instances, protocols, structures, and techniques have not been shown in detail.

Example embodiments described herein provide systems and methods for omni-channel state preservation across different communication channels. The ability to store user product selections or wish lists in online marketplace environments is known. Such lists can be accessed by a user when returning to the store. These do not preserve a user's state in an online session. Session preservation is an aspect distinct from listing creation or storage per se and can be an important or desirable user feature for content providers and merchants in on-line marketplaces, for example. The present subject matter is not limited to such applications but will be described in this context. Session preservation (also termed state or status preservation in this specification) can improve sales conversion rates (i.e. converting product offerings into actual sales), engagement windows, and other indicators used by online merchants and content providers to track online performance.

In some examples, flow chain elements in a transaction flow are identified. For example, if a user intends to purchase a car in a transaction flow, a first flow chain element may be an online or physical search through vehicle inventories, a second flow chain element might be the creation of a short list, a third flow chain element might be test driving a real car or, in an online environment, "building" a virtual car and arriving at a total cost for the selection of certain options. A final flow chain element might be a purchase of the vehicle which may include sub-elements or sub-steps enabling a purchase, such as contacting a bank or third party payment service to source funds. It will be appreciated that many types of flows, flow chain elements, and sub-elements are possible.

The flow chain elements are performed as the user approaches the end of a transaction flow, such as a final purchase decision. It will be appreciated that a transaction flow need not end in a purchase. Indeed, in many examples, it may not. For example, some transactions may conclude with a decision (without payment of any fee) to join an interest group, with the user perhaps having browsed many materials as flow chain elements in arriving at that decision. An election to join a subscription list, or a decision to wear certain clothing based on a review of weather reports, might be other examples of flow chain elements in transaction flows. In one example, a final chain element might be purchasing an item for sale in a retail store or in an online marketplace. Still, other examples are possible.

Transaction flows and flow chain elements (including applicable sub-elements) can be identified in accordance with the present subject matter, and are presented in such a manner so as to preserve a user's state in a transaction flow in the event a communication channel, used by a user to conduct the transaction, is changed. A communication channel may be changed, for example, by moving from a mobile communication device (a smartphone, for example) to a desktop personal computer. In some examples, a user's status in a session can be created or preserved from a first flow chain element to a final chain element in a transaction flow and, thus, create a "continuous" or "seamless" session even when the session is conducted across different devices, or on the same device, but at a later time. A user's state can, in such a transaction flow, be preserved even if the user uses different communication devices in proceeding through the various flow chain elements in the transaction flow.

Figure 4:
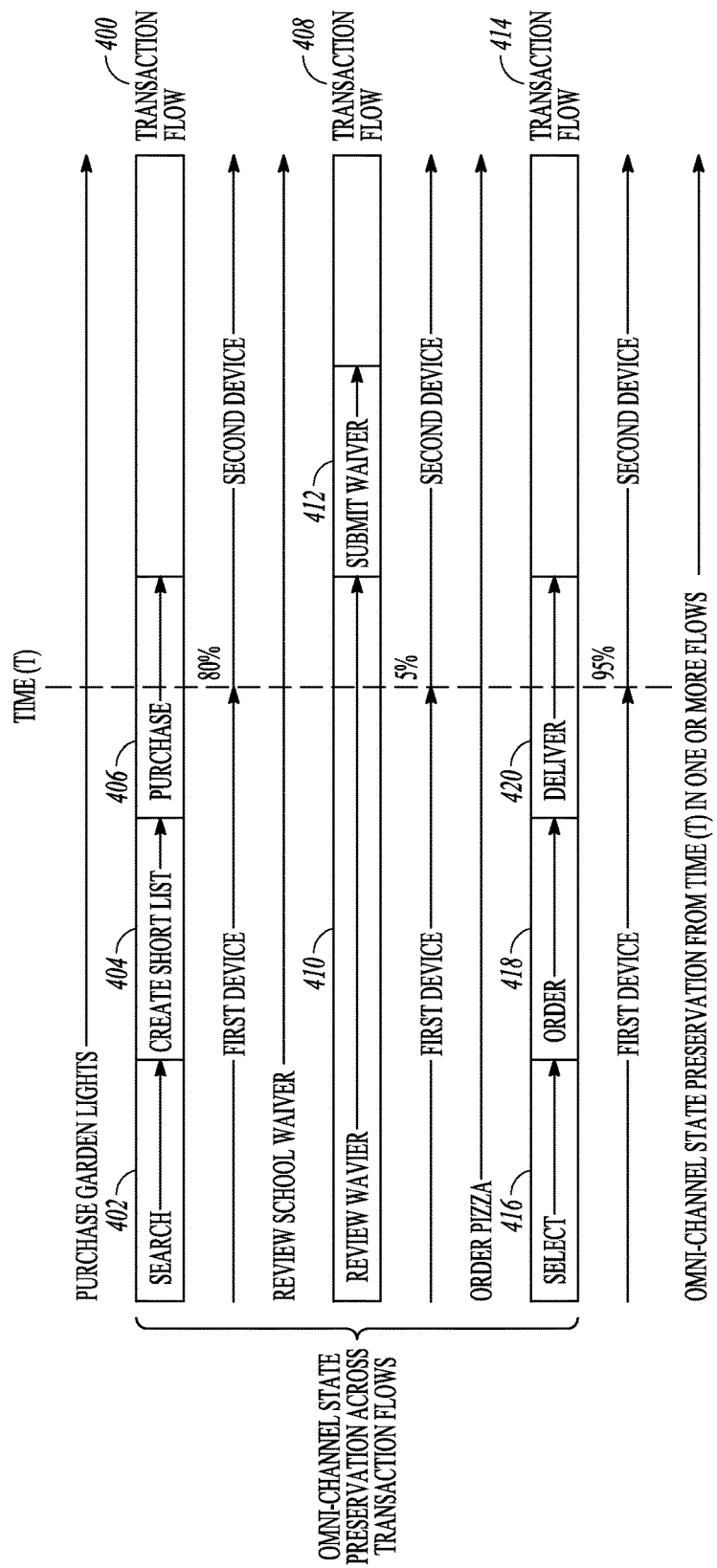
FIG. 4 is a diagram illustrating example transaction flows, in accordance with some embodiments.

In some examples, a user's state in a plurality of transaction flows is preserved. FIG. 4 of the accompanying drawings represents a plurality of transaction flows. In this case, three example flows 400, 408, and 414, which may or may not be performed in a single user session (or several sessions), are shown. Further transaction flows are possible.

In one example flow 400, a user may be browsing for garden lights to purchase for an upcoming dinner party. Various flow chain elements may be involved in the transaction flow, such as a search flow chain element 402, a short list creation flow chain element 404, and a purchase flow chain element 406. Assuming that using a first device and at a point in time (marked T), the user is 80% of the way down this transaction flow 400 having already passed through a number of flow chain elements 402-406 (and perhaps others, or portions thereof) along the way to the completion of the transaction. It will be appreciated that at any given time, and on any given device, a user may be at a different point in a transaction flow, yet still have the ultimate goal of concluding, on the same device or another device, the transaction flow and reaching a final flow chain element.

Referring again to FIG. 4, another transaction flow 408 may include a waiver review flow chain element 410, and a waiver submission flow chain element 412 pertaining to some forms required for a school field trip, for example. Rather than scrolling through the fine print of a waiver release on a mobile device, a busy parent (needing to review the waiver) may wish to take special care in reviewing the terms and defer the review until later that evening after work when the parent is calmly seated at a computer screen. It will be appreciated that many examples are possible, such as reviewing an employment contract, or reading a book, for example. In the current example, let us assume the busy parent is, at time T, only 5% along the waiver review transaction flow 408 when leaving work and having conducted 5% of the transaction flow on the first device.

A third transaction flow 414 might be ordering pizza for an office lunch. Here, the busy parent in the example above may feel very comfortable in ordering the pizza on a first mobile device and might, in fact, complete such a transaction on the same device having already passed through the applicable selection flow chain element 416, the ordering flow chain element 418, and the delivery flow chain element 420, for example.

As an overview, at a given point in time (time T for example), the user in the above examples might be 80% of the way through a garden light transaction flow 400, 5% of the way through a waiver review transaction flow 408, and nearly 100% (say 95% for example) of the way through a pizza order transaction flow 414. In accordance with the present subject matter, the user's state in each of these flows 400, 408 and 414 can be preserved across different communication channels or devices that may be utilized by the user in completing each of the transaction flows 400, 408, and 414.

Thus, assuming the user was at an 80% marker down the garden light transaction flow 400 when changing communication channels, the systems, methods and media of the present subject matter allow that particular user to continue the session at an 81% position irrespective of whether the user continues the session using another communication device at home, or a smart screen in her vehicle, for example. Similarly, assuming the user was at a 5% position down the waiver review transaction flow 408 when leaving work, the systems, methods and media of the present subject matter allow that particular user to continue the session at a 6% marker irrespective of whether the user continues the session using the same device, another communication device, or another device or channel at an internet cafe during a coffee break, for example. The same functionality and convenience can be applied to the transaction flow 414. The percentage positions and bar chart elements used to denote a user's progress through the illustrated transaction flows are merely exemplary and are to scale. They are provided to assist in describing the present subject matter in an exemplary way. It will be appreciated that other position indicators are possible.

In other examples, and in looking at the present subject matter from the perspective of a marketplace participant, such as a content provider or merchant, flow chain elements which are more optimally presented on certain types of devices (or via certain communication channels) can be identified. For example, targeted information (as defined herein) can be selected for presentation in various transaction flows, or in specific or targeted flow chain elements, or sub-elements as desired, across different communication channels. Maintaining consistency of message and preserving a user's engagement are example aspects that can be helpful in promoting online sales and influencing user behavior, for example. Targeted information, or flow chain elements, may in some examples be created, withheld from presentation, or presented in a different order, time frame, or in other flow chain elements, on disparate devices, or via alternate communication channels, for example.

In some examples, preserving a user's state can prevent data loss and inconvenience. The preservation of an online status in a user session can allow a user to more freely select the most appropriate device for advancing through a series of flow chain elements in a transaction flow. In some examples, a variety of communication channels can be used without inconvenience or the fear of "going backwards" in a transaction flow when a different device is used. Various examples of transaction flows in which the present subject matter can be useful are discussed above. Other examples are possible.

In one example, a user may on a bus using a mobile device to search for items in an electronic marketplace using a mobile application. The user may be looking at a view items page when she arrives at her destination and stops her engagement, exits the bus and walks home. At home she opens her tablet device and launches a marketplace application. An example omni-channel state preservation system disclosed herein determines that it is appropriate to continue the previous "bus session mobile" into a "home session tablet" and restores the mobile device state on the tablet device. In some examples, the system initially shows the same view item page but in some examples restores the navigation path stack that brought the user to the view item page. The restored navigation path allows back buttons to be used returning the user to her previous search results, prior user interfaces and back again to her search or refinement user interfaces.

In another example, a user is at home and in a payment flow in an online session when she abandons the session and moves to a vehicle. When getting into the vehicle she is promoted with a message to "Complete your payment flow using voice authentication?" In response, she can complete her session in the car using a substantially different interface paradigm.

The disclosed examples use the idea of a continuation "session" that is maintained between devices with different capabilities. The examples seek to convey that notion that a user can have a fundamental relationship with a business (e.g. an online marketplace) and not necessarily with a device or system used to access that marketplace. Devices such as a web browser, a mobile application, a tablet application, or audio/voice application need not limit a user's relationship with a business in the disclosed examples.

In some examples, consideration of a continuation session might imply that continuing a single session is always the desirable or appropriate thing to do. There are a number of factors that can help determine if this is in fact true. A time element would be one factor. For example, one could say with some degree of certainty that if, as in the bus example further above, the engagement between devices is relatively short in time (say, less than 15 minutes) that it is likely that a continuation session would be the appropriate thing to do. In some examples, a criticality or nature of a task might be another factor, like completing a payment flow in car. But what about the case where a continuation session might not be the right thing to do? Say a user abandoned a session three days ago and re-launches an application. Some examples include reviewing defined session factors (including those mentioned above) to determine in which instances a session status should be preserved.

In some examples, the concept of more than one session is introduced. For simplicity we will use an example such as a user initiating a search, clicked on time in the feed (i.e. limited the search results to a defined time period), and responded to an RTM message. Such high level (tier 1 events) would signify the starting of a new session. Each session may have a phase and strength associated with it. In the case where it unclear that a continuation session is warranted, intent tracking streams can be used to identify a user's intent, or a proxy for a user's intent, to characterize the session accordingly. In some examples, user behavior is highly predictable based on past behavior, and in some instances on other factors such as geo-location and time of day, or biometric information. An ability to track such factors across many business entities and online domains enables a marketplace participant (e.g. a merchant, retail store, or content provider) to build an intent based profile for a specific user interaction. For example, at a given moment in time, at a given geo-location, based on a user's past activities there is a 90 percent likelihood that an engagement opportunity with the user will be 90 seconds or less and there is a 95 percent likelihood that they will not buy anything. This type of data can enable the marketplace participant to infer that in this example the user is in an inspirational moment, perhaps at lunch looking for distraction. Selecting from a queue of stored "sessions" or creating a new session, one that best meets the inspirational criteria for the user, is provided in some examples. In such a manner, this functionality can bridge a gap between "situational relevance" and/or "context coherence" and a concept of "hyper-personalization".

In some examples, targeted information or other content can be presented via a mobile device. More generally, such information may be presented via an "interface." An interface can exist in many forms. For example, the interface may interact with a user, in a functional or physical way, and may contribute and/or consume content. The interface may be associated with a device, but not necessarily so. The interface may be mouse driven, voice driven, or touch driven, for example. An associated device might be network enabled, but not necessarily so. The device or interface may be associated with local or proximate processing capability. In some examples, a physical interface may be presented by "smart" glasses (for example, Google glasses). In other embodiments, an interface may be intangible, such as a hologram. In further examples, the interface may be may be a non-mobile surface, such as a wall, table top, or side of an appliance. In other examples, an interface may be provided in a kiosk, or by a surface or device inside a motor vehicle.

Targeted information or other content may include "consumable" information or "non-consumable" information (for example, metadata). Consumable examples can be displayed, emailed, pushed, or included in a text message. The information may include tiles, social media, digital data, physical (billboard) embodiments, audio files, commercial art, smart advertisements, and so forth. Viewed broadly, a "device" is any physical object which is capable of being a communication device or can present an interface. The device may be associated with local computational or remote computational functionality.

In some examples, targeted information may include "ad content." Ad content may include promotional information which characterizes this information from general content. A "promotion" in ad content need not be tied to commerce, payment, or a transaction, but will usually be associated with the receipt of some kind of value. The value could relate to a good or a service (or hybrid of same).

The presentation of the targeted information may seek to extend on-line user "sessions." In a multi-device world, the conventional definition of a session is becoming increasingly inapplicable. Viewed more broadly, a session in this disclosure includes the idea that the user is trying to achieve a particular task, with that task potentially spread over multiple devices and extended time periods. The user could pick up a session on a different device, or after a lapse of time, and so forth. A user could have many parallel sessions going on simultaneously, for example. A session may include user phases, such as a discovery phase, an exploratory phase, a follow-up phase, and so forth. Sessions may be assessed or tied to a success metric, such as a "Bid-Buy-Offer-Watch-Ask seller question" (BBOWA) metric, for example.

The examples discussed above merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 illustrates a network diagram in which embodiments of a system 100 for omni-channel state preservation may be implemented. A networked system 102 forms a network-based publication system that provides server-side functionality, via a network 104 (e.g., the Internet or Wide Area Network (WAN)), to one or more clients and devices. FIG. 1 further illustrates, for example, one or both of a web client 106 (e.g., a web browser) and a programmatic client 108 executing on client machines 110 and 112. In one embodiment, the system 100 comprises a marketplace system. In another embodiment, the system 100 comprises other types of systems such as, but not limited to, a social networking system, a matching system, an electronic commerce (e-commerce) system, and the like. An e-commerce environment may include items listed for sale at a brick-and-mortar retailer, an on-line retailer, or an auction site, for example.

Each of the client machines 110, 112 comprises a computing device that includes at least a display (interface) and communication capabilities with the network 104 to access the networked system 102. The client machines 110, 112 comprise, but are not limited to, work stations, computers, general purpose computers, Internet appliances, hand-held devices, wireless devices, portable devices, wearable computers, cellular or mobile phones, portable digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. Each of the client machines 110, 112 may connect with the network 104 via a wired or wireless connection. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a Wi-Max network, another type of network, or a combination of two or more such networks.

Each of the client machines 110, 112 include one or more applications (also referred to as "apps") such as, but not limited to, a web browser, a messaging application, an electronic mail (email) application, an e-commerce site application (also referred to as a marketplace application), and the like. In some embodiments, if the e-commerce site application is included in one of the client machines 110, 112, then the application is configured to locally provide the user interface and at least some of the functionalities, the application configured to communicate with the networked system 102, on an as needed basis, for data and/or processing capabilities not locally available (such as access to a database of items available for sale, to authenticate a user, to verify a method of payment, etc.). Conversely, if the e-commerce site application is not included in one of the client machines 110, 112, then the client machines 110, 112 may use its web browser to access the e-commerce site (or a variant thereof) hosted on the networked system 102. Although two client machines 110, 112 are shown in FIG. 1, more or less than two client machines can be included in the system 100.

An Application Program Interface (API) server 114 and a web server 116 are coupled to, and provide programmatic and web interfaces respectively to, one or more application servers 118. The application servers 118 host one or more marketplace applications 120, payment applications 122, and state preservation applications 123. The application servers 118 are, in turn, shown to be coupled to one or more database servers 124 that facilitate access to one or more databases 126.

The marketplace applications 120 may provide a number of e-commerce functions and services to users that access the networked system 102. E-commerce functions/services may include a number of publisher functions and services (e.g., search, listing, content viewing, payment, etc.). For example, the marketplace applications 120 may provide a number of services and functions to users for listing goods and/or services, offers for goods and/or services for sale, searching for goods and services, facilitating transactions, and reviewing and providing feedback about transactions and associated users. Additionally, the marketplace applications 120 may track and store data and metadata relating to listings, transactions, and user interactions. In some embodiments, the marketplace applications 120 may publish or otherwise provide access to content items stored in the application servers 118 or databases 126 accessible to the application servers 118 and/or the database servers 124. The payment applications 122 may, likewise, provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products or items (e.g., goods or services) that are made available via the marketplace applications 120. While the marketplace, payment and state preservation applications 120, 122, and 123 are shown in FIG. 1 to form part of the networked system 102, it will be appreciated that, in alternative embodiments, the payment applications 122 may form part of a payment service that is separate and distinct from the networked system 102. In other embodiments, the payment applications 122 may be omitted from the system 100. In some embodiments, at least a portion of the marketplace applications 120 or the state preservation applications 123 may be provided on the client machines 110 and/or 112.

Further, while the system 100 shown in FIG. 1 employs client-server architecture, embodiments of the present disclosure are not limited to such architecture, and may equally well find application in, for example, a distributed or peer-to-peer architecture system. The various marketplace, payment, and state preservation applications 120, 122 and 123 may also be implemented as standalone software programs which do not necessarily have networking capabilities.

The web client 106 accesses the various marketplace, payment, and state preservation applications 120, 122, and 123 via the web interface supported by the web server 116. Similarly, the programmatic client 108 accesses the various services and functions provided by the marketplace, payment, and state preservation applications 120, 122, and 123 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
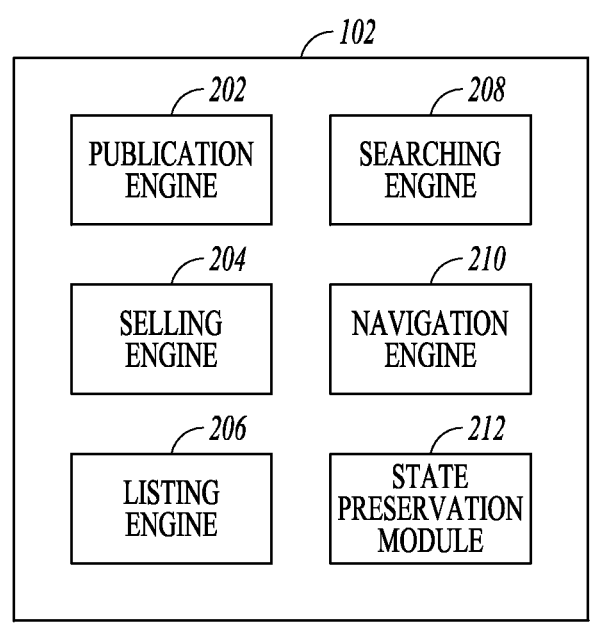
FIG. 2 illustrates a block diagram of additional details of the example system of FIG. 1, in accordance with some embodiments.

FIG. 2 illustrates a block diagram showing components provided within the networked system 102, according to some embodiments. The networked system 102 may be hosted on dedicated or shared server machines (not shown) that are communicatively coupled to enable communications between server machines. The components themselves are communicatively coupled (e.g., via appropriate interfaces) to each other and to various data sources, so as to allow information to be passed between the applications or so as to allow the applications to share and access common data. Furthermore, the components may access one or more databases 126 via the database servers 124.

The networked system 102 may provide a number of publishing, listing, and/or price-setting mechanisms whereby a seller (also referred to as a first user) may list (or publish information concerning) goods or services for sale or barter, a buyer (also referred to as a second user) can express interest in or indicate a desire to purchase or barter such goods or services, and a transaction (such as a trade) may be completed pertaining to the goods or services. To this end, the networked system 102 may comprise at least one publication engine 202 and one or more selling engines 204. The publication engine 202 may publish information, such as item listings or product description pages, on the networked system 102. In some embodiments, the selling engines 204 may comprise one or more fixed-price engines that support fixed-price listing and price setting mechanisms and one or more auction engines that support auction-format listing and price setting mechanisms (e.g., English, Dutch, Chinese, Double, Reverse auctions, etc.). The various auction engines may also provide a number of features in support of these auction-format listings, such as a reserve price feature whereby a seller may specify a reserve price in connection with a listing, and a proxy-bidding feature whereby a bidder may invoke automated proxy bidding. The selling engines 204 may further comprise one or more deal engines that support merchant-generated offers for products and services.

A listing engine 206 allows sellers to conveniently author listings of items or authors to write publications or other content. In one embodiment, the listings pertain to goods or services that a user (e.g., a seller) wishes to transact via the networked system 102. In some embodiments, the listings may be an offer, deal, coupon, or discount for the good or service. Each good or service is associated with a particular category. The listing engine 206 may receive listing data, such as title, description, and aspect name/value pairs. Furthermore, each listing for a good or service may be assigned an item identifier. In other embodiments, a user may create a listing that is an advertisement or other form of information publication. The listing information may then be stored to one or more storage devices coupled to the networked system 102 (e.g., databases 126). Listings also may comprise product description pages that display a product and information (e.g., product title, specifications, and reviews) associated with the product. In some embodiments, the product description page may include an aggregation of item listings that correspond to the product described on the product description page.

The listing engine 206 may also allow buyers to conveniently author listings or requests for items desired to be purchased. In some embodiments, the listings may pertain to goods or services that a user (e.g., a buyer) wishes to transact via the networked system 102. Each good or service is associated with a particular category. The listing engine 206 may receive as much or as little listing data, such as title, description, and aspect name/value pairs, that the buyer is aware of about the requested item. In some embodiments, the listing engine 206 may parse the buyer's submitted item information and may complete incomplete portions of the listing. For example, if the buyer provides a brief description of a requested item, the listing engine 206 may parse the description, extract key terms and use those terms to make a determination of the identity of the item. Using the determined item identity, the listing engine 206 may retrieve additional item details for inclusion in the buyer item request. In some embodiments, the listing engine 206 may assign an item identifier to each listing for a good or service.

In some embodiments, the listing engine 206 allows sellers to generate offers for discounts on products or services. The listing engine 206 may receive listing data, such as the product or service being offered, a price and/or discount for the product or service, a time period for which the offer is valid, and so forth. In some embodiments, the listing engine 206 permits sellers to generate offers from the sellers' mobile devices. The generated offers may be uploaded to the networked system 102 for storage and tracking.

Searching the networked system 102 is facilitated by a searching engine 208. For example, the searching engine 208 enables keyword queries of listings published via the networked system 102. In example embodiments, the searching engine 208 receives the keyword queries from a device of a user and conducts a review of the storage device storing the listing information. The review will enable the compilation of a result set of listings that may be sorted and returned to the client device (e.g., client machine 110, 112) of the user. The searching engine 208 may record the query (e.g., keywords) and any subsequent user actions and behaviors (e.g., navigations).

The searching engine 208 also may perform a search based on the location of the user. A user may access the searching engine 208 via a mobile device and generate a search query. Using the search query and the user's location, the searching engine 208 may return relevant search results for products, services, offers, auctions, and so forth to the user. The searching engine 208 may identify relevant search results, both in a list form and graphically on a map. Selection of a graphical indicator on the map may provide additional details regarding the selected search result. In some embodiments, the user may specify, as part of the search query, a radius or distance from the user's current location to limit search results. The searching engine 208 also may perform a search based on an image. The image may be taken from a camera or imaging component of a client device or may be accessed from storage.

In a further example, a navigation engine 210 allows users to navigate through various categories, catalogs, or inventory data structures according to which listings may be classified within the networked system 102. For example, the navigation engine 210 allows a user to successively navigate down a category tree comprising a hierarchy of categories (e.g., the category tree structure) until a particular set of listings is reached. Various other navigation applications within the navigation engine 210 may be provided to supplement the searching and browsing applications. The navigation engine 210 may record the various user actions (e.g., clicks) performed by the user in order to navigate down the category tree.

In some embodiments, a state preservation module 212 is configured to identify a plurality of flow chain elements in a transaction flow of a user session, and cause the presentation of a first flow chain element in the transaction flow in an interface of a first user device (for example, the client machine 110). The state preservation module 212 is also configured to cause the presentation of a second flow chain element in the transaction flow in an interface of a second user device (for example, the client machine 112). The state preservation module 212 preserves a state of the user in the session when causing the presentation of the second flow chain element in the second user device.

In some examples, the first and second flow chain elements in the transaction flow are time-contiguous elements in the transaction flow, and an end of the first flow chain element may be based on a position of the user in the session when the user leaves the first user device. In some examples, a status of the user at a beginning of the second flow chain element caused to be presented in the interface of the second user device is based on a status of the user in the first flow chain element of the transaction flow.

In some examples, the state preservation module 212 is configured to detect a user action on the first or second user device and cause the presentation of the second flow chain element in the interface of the second user device in response to the detection of the user action. In some examples, the state preservation module 212 is further configured to identify a status of the user in each of a plurality of sessions performed on the first user device, and cause the presentation of a second flow chain element in the interface of the second user device based on the identified status.

In some examples, the state preservation module 212 is further configured to detect an identity or characteristic of the first or second user device, and configure the content, timing, or presentation of the first or second flow chain element based on the identified identity or characteristic.

It is contemplated that the state preservation module 212 may be further configured to provide or perform any of the other features, functions, or operations disclosed below. Additional modules and engines associated with the networked system 102 are described herein in further detail. It should be appreciated that modules or engines may embody various aspects of the details described below.

Figure 3:
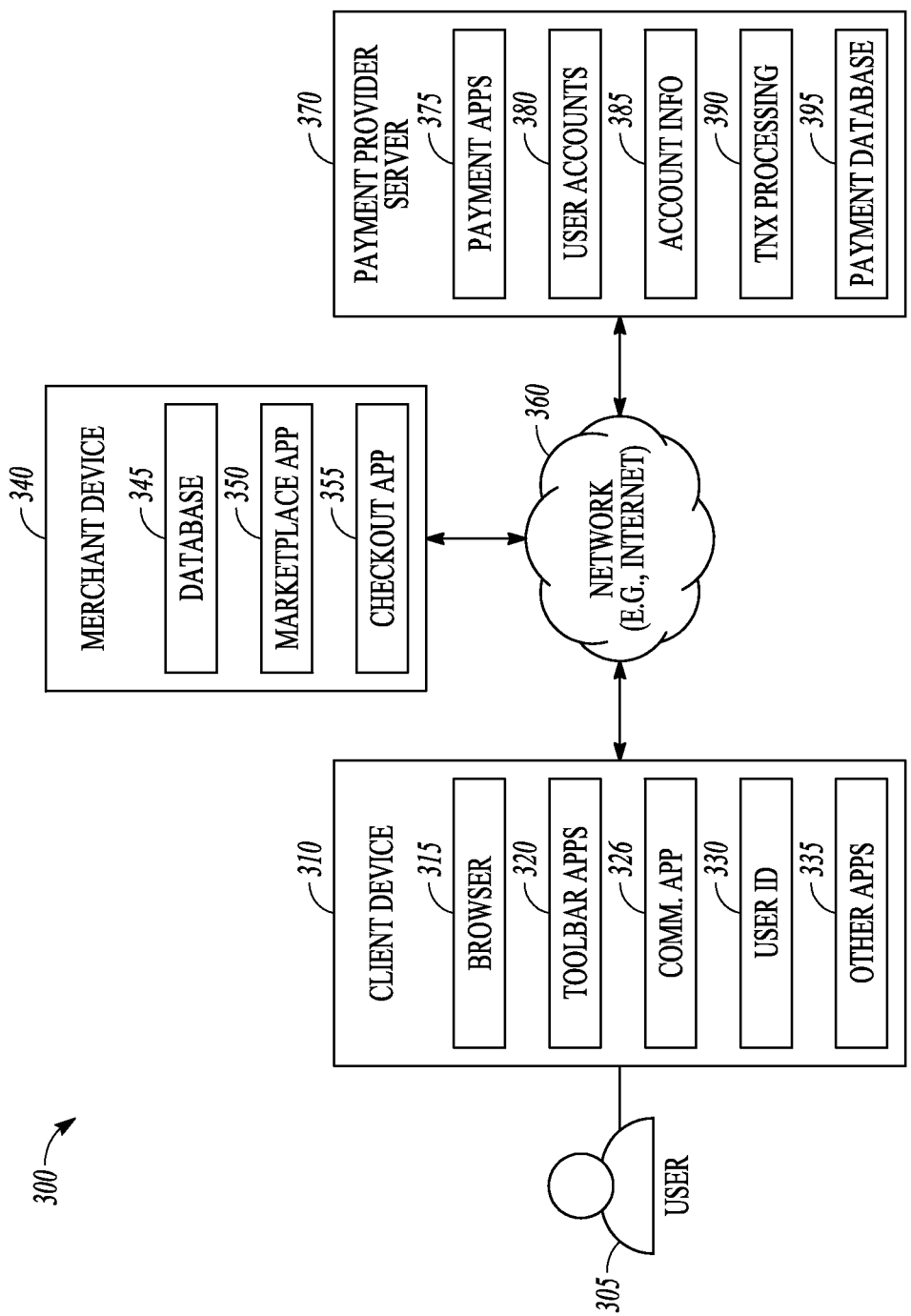
FIG. 3 illustrates a network diagram depicting an example system for providing a shopping assistant, in accordance with some embodiments.

FIG. 3 is a block diagram of a networked system 300 configured to handle processes, such as those described herein, in accordance with some embodiments. The system 300 includes a client device 310, a merchant device (e.g., server) 340, and a payment provider server 370 in communication over a network 360. The payment provider server 370 may be maintained by a service or payment provider, such as Pay Pal, Inc. or eBay, Inc. of San Jose, Calif. A user 305, such as a consumer, may utilize client device 310 to make a purchase transaction facilitated by the payment provider server 370, with one or more merchants.

The client device 310, merchant device 340, and payment provider server 370 may each include one or more processors, memories, and other appropriate components for executing instructions, such as program code and/or data stored on one or more computer readable mediums to implement the various applications, data, and steps described herein. For example, such instructions may be stored in one or more computer readable media such as memories or data storage devices internal and/or external to various components of the networked system 300, and/or accessible over the network 360.

The network 360 may be implemented as a single network or a combination of multiple networks. For example, in various embodiments, the network 360 may include the Internet or one or more intranets, landline networks, wireless networks, and/or other appropriate types of networks.

The client device 310 may be implemented using any appropriate hardware and software configured for wired and/or wireless communication over the network 360. For example, in one embodiment, the user or client device may be implemented as a personal computer (PC), a smart phone, personal digital assistant (PDA), laptop computer, and/or other types of computing devices capable of transmitting and/or receiving data, such as an iPad™ from Apple™.

The client device 310 may include one or more browser applications 315 which may be used, for example, to provide a convenient interface to permit user the 305 to browse information available over the network 360. For example, in one embodiment, the browser application 315 may be implemented as a web browser configured to view information available over the Internet or access a website of the payment provider. The client device 310 may also include one or more toolbar applications 320 which may be used, for example, to provide client-side processing for performing desired tasks in response to operations selected by the user 305. In some embodiments, the toolbar application 320 may display a user interface in connection with the browser application 315.

The client device 310 may further include other applications 335 as may be desired in particular embodiments to provide desired features to the client device 310. For example, the other applications 335 may include security applications for implementing client-side security features, programmatic client applications for interfacing with appropriate application programming interfaces (APIs) over the network 360, or other types of applications. The other applications 335 may also include email, texting, voice and IM applications that allow the user 305 to send and receive emails, calls, texts, and other notifications through the network 360. The client device 310 may include one or more user identifiers 330 which may be implemented, for example, as operating system registry entries, cookies associated with the browser application 315, identifiers associated with hardware of client device 310, or other appropriate identifiers, such as used for payment/user/device authentication or identification. In some embodiments, the user identifier 330 may be used by a payment service provider to associate the user 305 with a particular account maintained by the payment provider. A communications application 325, with associated interfaces, enables the client device 310 to communicate within the networked system 300.

The merchant device 340 may be maintained, for example, by a merchant or seller offering various items, products and/or services through an online site or app. Generally, the merchant device 340 may be maintained by anyone or any entity that receives money, which includes charities as well as retailers and restaurants. The merchant device 340 may include a database 345 identifying available products and/or services (e.g., collectively referred to as items), which may be made available for viewing and purchase by the user 305. The merchant device 340 may also include a marketplace application 350 which may be configured to serve information over the network 360 to the browser application 315 of the client device 310 and/or the payment provider server 370. In one embodiment, the user 305 may interact with the marketplace application 350 to view various items available for purchase from the merchant.

The merchant device 340 may also include a checkout application 355 which may be configured to facilitate the purchase by the user 305 of goods or services identified by the marketplace application 350. The checkout application 355 may be configured to accept payment information from or on behalf of the user 305 through the payment provider server 370 over the network 360. For example, the checkout application 355 may receive and process a payment confirmation from the payment provider server 370, as well as transmit transaction information to the payment provider and receive information from the payment provider (e.g., a transaction ID). The checkout application 355 may also be configured to accept one or more different funding sources for payment.

The payment provider server 370 may be maintained, for example, by an online service provider, which may provide payment between the user 305 and the operator of the merchant device 340. In this regard, the payment provider server 370 includes one or more payment applications 375, which may be configured to interact with the client device 310 and the merchant device 340 over the network 360 to facilitate the purchase of goods or services by the user 305 of the client device 310, as well as search merchant offerings and prices as discussed above.

The payment provider server 370 may also maintain a plurality of user accounts 380, each of which may include account information 385 associated with individual users. For example, account information 385 may include private financial information of users of devices, such as account numbers, passwords, device identifiers, user names, phone numbers, credit card information, bank information, or other financial information which may be used to facilitate online transactions by the user 305. Account information 385 may also include information associated with the payment process described herein. Beneficially, the payment application 375 may be configured to interact with merchant device 340 on behalf of user 305 during a transaction with checkout application 355 to handle payments.

A transaction processing application 390, which may be part of or separate from the payment application 375, may be configured to receive information from a client device 310 and/or merchant device 340 for processing and storage in a payment database 395 as described above. The transaction processing application 390 may include one or more applications to process information from the user 305 and/or the merchant for processing a transaction from the client device 310 as described herein. As such, the transaction processing application 390 may store details of a transaction or from an email and associate the details accordingly for individual users. The payment application 375 may be further configured to determine the existence of and to manage accounts for the user 305, as well as create new accounts if needed, such as the set-up, management, and the provision of various services as described herein.

Figure 5:
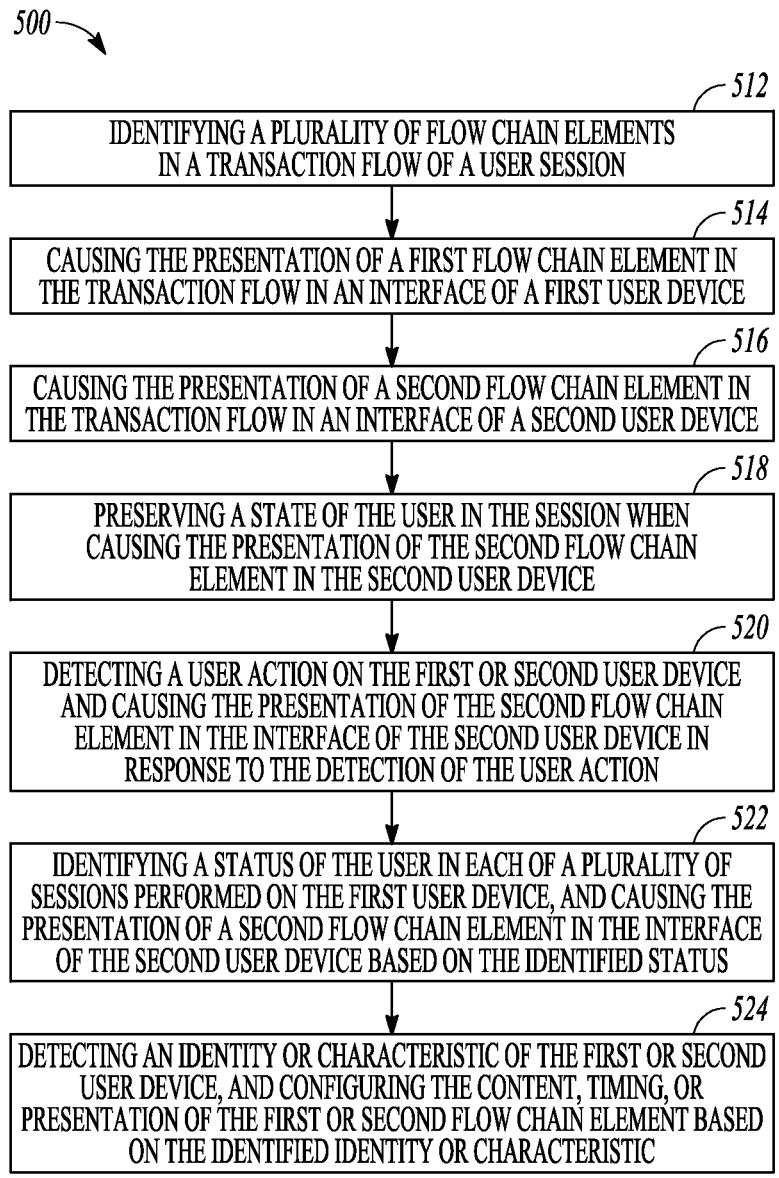
FIG. 5 is a flow diagram of an example method for omni-channel state preservation, in accordance with some embodiments.

FIG. 5 is a flowchart illustrating a method 500, in accordance with some embodiments. The operations of the method 500 may be performed by the client machine 110, client machine 112, and/or a server included in the networked system 102 (e.g., API server 114, web server 116, or application servers 118). The operations may be performed by modules (e.g., state preservation module 212). The various operations of the method 500 may be performed in different order and the method 500 may include only some of the operations described below.

The method 500 may comprise: at operation 512, identifying a plurality of flow chain elements in a transaction flow of a user session; at operation 514, causing the presentation of a first flow chain element in the transaction flow in an interface of a first user device; at operation 516, causing the presentation of a second flow chain element in the transaction flow in an interface of a second user device; and at operation 518, preserving a state of the user in the session when causing the presentation of the second flow chain element in the second user device.

In some examples of the method 500, the first and second flow chain elements in the transaction flow are time-contiguous elements in the transaction flow and an end of the first flow chain element is based on a position of the user in the session when the user leaves the first user device. Further in some examples, a status of the user at a beginning of the second flow chain element caused to be presented in the interface of the second user device is based on a status of the user in the first flow chain element of the transaction flow.

In some examples, the method 500 may further comprise, at operation 520, detecting a user action on the first or second user device, and causing the presentation of the second flow chain element in the interface of the second user device in response to the detection of the user action.

In some examples, the method 500 may further comprise, at operation 522, identifying a status of the user in each of a plurality of sessions performed on the first user device, and causing the presentation of a second flow chain element in the interface of the second user device based on the identified status.

In some examples, the method 500 may further comprise, at operation 524, detecting an identity or characteristic of the first or second user device, and configuring the content, timing, or presentation of the first or second flow chain element based on the identified identity or characteristic.

It is contemplated that any of the features and/or embodiments of the methods, systems and media discussed herein may be combined or incorporated into any of the other features and/or embodiments.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software), may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respectively different hardware modules at different times. Software may, accordingly, configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiples of such hardware modules exist contemporaneously, communications may be achieved through signal transmissions (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below, are set out hardware (e.g., machine) and software architectures that may be deployed in various example embodiments.

Example Machine Architecture and Machine-Readable Medium

Figure 6:
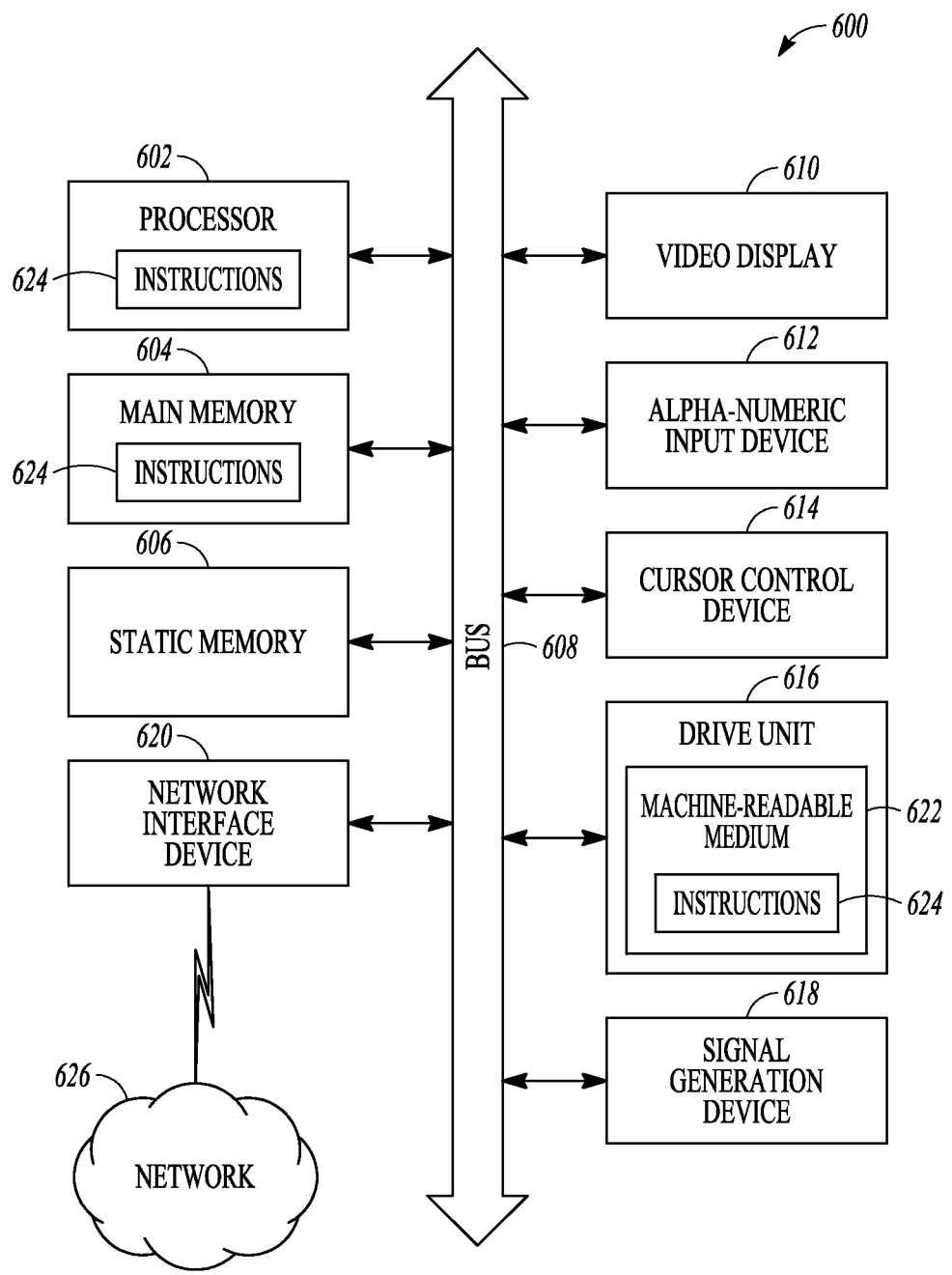
FIG. 6 shows a diagrammatic representation of a machine, in the example form of a computer system, within which a set of instructions may be executed to cause the machine to perform any one or more of the methodologies discussed herein, in accordance with some embodiments.

FIG. 6 is a block diagram of a machine, in the example form of a computer system 600, within which instructions 624 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that, individually or jointly, execute a set (or multiple sets) of instructions 624 to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a disk drive unit 616, a signal generation device 618 (e.g., a speaker) and a network interface device 620.

Machine-Readable Medium

The disk drive unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media 622. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions 624 for execution by the machine, and that cause the machine to perform any one or more of the methodologies of the present embodiments, or that is capable of storing, encoding or carrying data structures utilized by or associated with such instructions 624. The term "machine-readable medium" shall, accordingly, be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM), and flash memory devices; magnetic disks, such as internal hard disks and removable disks; magneto-optical disks; and compact disc-read-only memory (CD-ROM) and digital versatile disc (or digital video disc) read-only memory (DVD-ROM) disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks 626 include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 624 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is, in fact, disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:
    one or more processors, and a memory including instructions, which when executed by the one or more processors, cause the one or more processors to perform operations comprising:
    identifying a plurality of flow chain elements in a transaction flow of a browsing session;
    causing presentation of a first flow chain element in the transaction flow in an interface of a first user device of a user;
    preserving, at a database by a state preservation system without user input, a state of the browsing session at the first user device;
    in response to detecting an end of the browsing session at the first user device and use of a second user device, automatically determining, by the state preservation system, whether to continue the transaction flow on a second user device of the user, the automatically determining whether to continue the transaction flow comprising:
        determining that an amount of time that has elapsed between user activity associated with the first user device and user activity associated with a second user device is less than a predetermined amount of time,
        selecting from a plurality of stored sessions for the user, at least one stored session that has a similar given time and geo-location of the user, and
        determining, from an intent-based profile based on the at least one stored session that has the similar given time and geo-location of the user, a likelihood that the use of the second user device will or will not result in a completion of the transaction flow; and
    in response to the determining that the amount of time that has elapsed is less than the predetermined amount of time and that the likelihood that the use of the second user device will result in the completion of the transaction flow, automatically retrieving, by the state preservation system without user input, the preserved state from the database and causing presentation of a second flow chain element in the transaction flow in an interface of the second user device.

2. The system of claim 1, wherein the first and second flow chain elements in the transaction flow are time-contiguous elements in the transaction flow and wherein an end of the first flow chain element is based on a position of the user in the session when the user leaves the first user device.

3. The system of claim 1, wherein a status of the user at a beginning of the second flow chain element caused to be presented in the interface of the second user device is based on a status of the user in the first flow chain element of the transaction flow.

4. The system of claim 1, wherein the operations further comprise:
    detecting a user action on the first or second user device; and
    wherein the causing the presentation of the second flow chain element in the interface of the second user device is further in response to the detecting of the user action.

5. The system of claim 1, wherein the operations further comprise:
    identifying a status of the user in each of a plurality of sessions performed on the first user device; and
    wherein causing the presentation of the second flow chain element in the interface of the second user device is further based on the identified status.

6. The system of claim 1, wherein the operations further comprise:
    detecting an identity or characteristic of the first or second user device; and
    configuring content, timing, or presentation of the first or second flow chain element based on the identified identity or characteristic.

7. A method comprising:
    identifying a plurality of flow chain elements in a transaction flow of a browsing session;
    causing presentation of a first flow chain element in the transaction flow in an interface of a first user device of a user;

preserving, at a database by a state preservation system without user input, a state of the browsing session at the first user device;

in response to detecting an end of the browsing session at the first user device and use of a second user device, automatically determining, by the state preservation system, whether to continue the transaction flow on a second user device of the user, the automatically determining whether to continue the transaction flow comprising:

determining that an amount of time that has elapsed between user activity associated with the first user device and user activity associated with a second user device is less than a predetermined amount of time, selecting from a plurality of stored sessions for the user, at least one stored session that has a similar given time and geo-location of the user; and determining, from an intent-based profile based on the at least one stored session that has the similar given time and geo-location of the user, a likelihood that the use of the second user device will or will not result in a completion of the transaction flow; and in response to the determining that the amount of time that has elapsed is less than the predetermined amount of time and that the likelihood that the use of the second user device will result in the completion of the transaction flow, automatically retrieving, by the state preservation system without user input, the preserved state from the database and causing presentation of a second flow chain element in the transaction flow in an interface of the second user device.

8. The method of claim 7, wherein the first and second flow chain elements in the transaction flow are time-contiguous elements in the transaction flow and wherein an end of the first flow chain element is based on a position of the user in the session when the user leaves the first user device.

9. The method of claim 7, wherein a status of the user at a beginning of the second flow chain element caused to be presented in the interface of the second user device is based on a status of the user in the first flow chain element of the transaction flow.

10. The method of claim 7, further comprising:
detecting a user action on the first or second user device; and
wherein the causing the presentation of the second flow chain element in the interface of the second user device is further in response to the detecting of the user action.

11. The method of claim 7, further comprising:
identifying a status of the user in each of a plurality of sessions performed on the first user device; and
wherein causing the presentation of the second flow chain element in the interface of the second user device is further based on the identified status.

12. The method of claim 7, further comprising:
detecting an identity or characteristic of the first or second user device; and
configuring content, timing, or presentation of the first or second flow chain element based on the identified identity or characteristic.

13. A machine-readable medium not having any transitory signals and storing instructions that, when executed by at least one processor of a machine, cause the machine to perform operations comprising:

identifying a plurality of flow chain elements in a transaction flow of a browsing session;

causing presentation of a first flow chain element in the transaction flow in an interface of a first user device of a user;

preserving, at a database by a state preservation system without user input, a state of the browsing session at the first user device;

in response to detecting an end of the browsing session at the first user device and use of a second user device, automatically determining, by the state preservation system, whether to continue the transaction flow on a second user device of the user, the automatically determining whether to continue the transaction flow comprising:

determining that an amount of time that has elapsed between user activity associated with the first user device and user activity associated with a second user device is less than a predetermined amount of time, selecting from a plurality of stored sessions for the user, at least one stored session that has a similar given time and geo-location of the user; and determining, from an intent-based profile based on the at least one stored session that has the similar given time and geo-location of the user, a likelihood that the use of the second user device will or will not result in a completion of the transaction flow; and in response to the determining that the amount of time that has elapsed is less than the predetermined amount of time and that the likelihood that the use of the second user device will result in the completion of the transaction flow, automatically retrieving, by the state preservation system without user input, the preserved state from the database and causing presentation of a second flow chain element in the transaction flow in an interface of the second user device.

14. The machine-readable medium of claim 13, wherein the first and second flow chain elements are time-contiguous elements in the transaction flow and wherein an end of the first flow chain element is based on a position of the user in the session when the user leaves the first user device.

15. The machine-readable medium of claim 13, wherein a status of the user at a beginning of the second flow chain element caused to be presented in the interface of the second user device is based on a status of the user in the first flow chain element of the transaction flow.

16. The machine-readable medium of claim 13, wherein the operations further comprise detecting a user action on the first or second user device; and
wherein the causing the presentation of the second flow chain element in the interface of the second user device is further in response to the detecting of the user action.

17. The machine-readable medium of claim 13, wherein the operations further comprise identifying a status of the user in each of a plurality of sessions performed on the first user device; and
wherein the causing the presentation of the second flow chain element in the interface of the second user device is further based on the identified status.

18. The machine-readable medium of claim 13, wherein the operations further comprise:
detecting an identity or characteristic of the first or second user device; and
configuring content, timing, or presentation of the first or second flow chain element based on the identified identity or characteristic.

19. The system of claim 1, wherein the operations further comprise restoring the navigation path stack based on the retrieved preserved state, the restored navigation path stack allowing back buttons to be usable to return to previous results of the browsing session.

20. The system of claim 1, wherein:
the automatically retrieving the preserved state is in response to the determining that the amount of time that has elapsed is less than the predetermined amount of time, that the likelihood that the use of the second user device will result in the completion of the transaction flow, and that the likely length of time the user will browse on the second user device is above a predetermined threshold.

* * * * *